Patented Apr. 25, 1939

2,155,755

UNITED STATES PATENT OFFICE 2,155,755

MONO-AZO DYESTUFFS

Friedrich Felix and Wilhelm Huber, Basel, Switzerland, assignors to the firm of Society of Chemical Industry in Basle, Basel, Switzerland No Drawing. Application November 15, 1937, Serial No. 174,722. In Switzerland November 19, 1936

3 Claims. (Cl. 260—207)

This invention relates to new mono-azo-dyestuffs and more particularly it relates to azo-dyestuffs which may be represented by the formula:

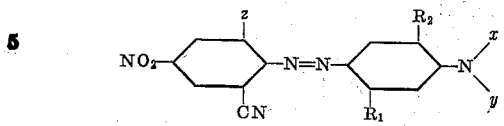

wherein $x$ represents hydrogen, alkyl, benzyl or phenyl, $y$ represents alkyl or benzyl, $R_1$ represents an acylated amino-group and $R_2$ halogen, alkyl, alkoxy or an acylated amino-group and $z$ represents hydrogen, halogen or nitro.

The term "alkyl" embraces unsubstituted alkyl groups as well as substituted alkyl groups.

The new azo-dyestuffs are dark powders when dry. They dissolve in organic solvents, for instance pyridine, to red, violet, blue or green solutions and, when suitably dispersed dye cellulose esters and ethers as well as laquers produced on their basis red, violet, blue or green tints.

As coupling components there come into question amines which contain in 2-position or in 2- and in 5-position a further acylated amino-group. Advantageously, the amino-group in 1-position should contain at least one alkyl, aralkyl or aryl residue, those alkyl residues being especially suitable which carry hydroxyl-groups capable of etherification or esterification. They may, however, also contain other substituents, for instance halogen, cyanogen, sulfone-groups or the like.

As further substituents of non-acid nature ($R_2$) there are especially suitable alkyl, hydroxy-alkyl or aralkyl groups; also alkyloxy groups, halogen atoms, hydroxy groups or the like may be present. Of these compounds the following may be named: 1-amino-3-acetylaminobenzene, 1-N-(di-hydroxy-ethylamino)-2-methoxy-5-acetylaminobenzene, 1-N-bis-(dihydroxy-propyl-amino)-2-methoxy-5-acetylaminobenzene, 1-N-(diethyl)-amino-2-methoxy-5-acetylaminobenzene, 1-N-(dimethyl)-amino-2-methoxy-5-acetylaminobenzene. The alkyl residues may also be different, for instance 1-N-(methyl-hydroxy-ethyl)-amino-2-methoxy-5-acetylaminobenzene may be used. The hydroxy-groups may be etherified by methyl- or ethyl-groups; alternatively they may be esterified by means of organic acids, for example formic acid, acetic acid or by means of inorganic acids, for example sulfuric acid. There are further suitable compounds like 1-N-alkyl- or -dialkylamino-2-alkoxy-5-hydroxyalkylacetylaminobenzenes, for instance 1-N-(dimethyl)-amino-2-methoxy-5-hydroxyethylacetylaminobenzene, 1-N-(dimethoxyethyl)-amino-2-methoxy-5-hydroxyethylacetylaminobenzene, 1-N-(dimethoxyethyl)-amino-2-methoxy-5-dihydroxypropylacetylaminobenzene or 1-N-(alkyl or dihydroxyalkyl)-amino-2:5-diacetylaminobenzenes.

As diazo-components there may be used 1-amino-4-nitro-2-cyanobenzene, 1-amino-2:4-dinitro-6-cyanobenzene, 1-amino-2-chloro-4-nitro-6-cyanobenzene, 1-amino-2-bromo-4-nitro-6-cyanobenzene or the like.

The dyestuffs produced are dark powders characterized by their suitability for dyeing cellulose esters and ethers. They may also be used as intermediate products for making further dyestuffs. By the invention there may be obtained in particular dyestuffs having the valuable property of dyeing acetate artificial silk blue tints capable of white discharge which are remarkable for their purity and green cast.

The following examples illustrate the invention but the invention is not restricted to these examples. The parts are by weight:

Example 1

16.3 parts of 4-nitro-2-cyano-1-aminobenzene are diazotized in usual manner by means of a nitrosyl sulfuric acid corresponding with 6.9 parts of sodium nitrite in concentrated sulfuric acid. So soon as a sample dissolves clearly in ice water, the mass is poured into ice water and the diazo solution thus obtained is coupled with a solution of 26.8 parts of 1-N-(dihydroxyethyl)-amino-2-methoxy-5-acetylaminobenzene in dilute hydrochloric acid. The coupling is brought to a finish by adding sodium acetate. The dyestuff thus obtained of the formula:

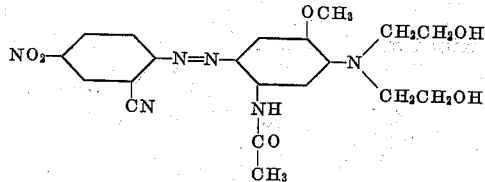

is a dark powder when dry; it dissolves in organic solvents for instance ethyl acetate and acetone, to a reddish blue solution; when suitably dispersed it dyes acetate artificial silk reddish blue tints.

Similar dyeing dyestuffs are obtained by the reaction of diazo-compounds from 4-nitro-2-cyano-1-aminobenzene with 1-N-monoethyl-2-methoxy-5-acetylaminobenzene, 1-N-monooctodecyl-2-methoxy-5-acetylaminobenzene, 1-N-dimethyl- or -diethyl-2-methoxy-5-acetylaminobenzene, 1-N-benzyl-2-methoxy-5-acetylaminobenzene, 1-N-benzylethyl-2-methoxy-5-acetylaminobenzene and 1-N-phenyl-2-methoxy-5-acetylaminobenzene, which dyestuffs are dark powders dissolving in pyridine to red, violet, blue solutions and dyeing esters and ethers of cellulose the same tints.

*Example 2*

16.3 parts of 1-amino-2-cyano-4-nitrobenzene are diazotized as described above by means of nitrosyl sulfuric acid and the diazo solution obtained is coupled with a solution of 29.6 parts of 1-N-(dimethoxyethyl)-amino-2-methoxy-5-acetylaminobenzene in dilute hydrochloric acid. The dyestuff obtained of the formula:

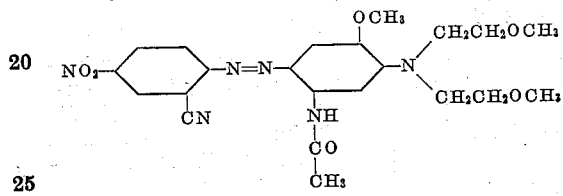

is a dark powder when dry; it dissolves in organic solvents such as acetone or ethyl acetate to a reddish blue solution and dyes acetyl cellulose in the mass pure reddish blue tints.

By coupling the diazo-compound of the above base with 1-N-ethyl-hydroxyethyl-2-methoxy-5-ethylaminobenzene, 1-N-methyl-hydroxypropyl-2-methoxy-5-acetylaminobenzene, or 1-N-ethyl-methyl-2-methoxy-5-acetylaminobenzene, there are obtained dyestuffs having similar properties. Instead of the above components there may also be used 1-N-ethyl-dihydroxypropyl-2-ethoxy-5-benzoylaminobenzene, 1-N-dihydroxypropyl-2-ethoxy-5-benzene-sulfaminobenzene or 1-N-dibutyl-2-methyl- or -2-chloro-5-methyl-sulfaminobenzene. All these dyestuffs are dark powders dissolving in pyridine to red, violet, blue and green solutions and dyeing esters and ethers of cellulose and lacquers produced on their basis the same tints.

*Example 3*

19.75 parts of 1-amino-2-cyano-4-nitro-6-chlorobenzene are diazotized by introduction into an ice-cooled solution of nitrosyl sulfuric acid corresponding with 6.9 parts of sodium nitrite in concentrated sulfuric acid and the diazo solution thus obtained is coupled with a solution of 26.8 parts of 1-N-(dihydroxyethyl)-amino-2-methoxy-5-acetylaminobenzene in dilute hydrochloric acid. The coupling is completed by addition of sodium acetate. The dry dyestuff thus obtained of the formula:

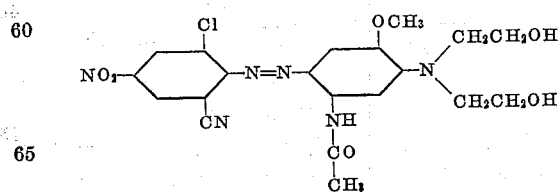

is a dark powder soluble in organic solvents, for instance ethyl acetate or acetone to a greenish blue solution and dyes acetate artificial silk pure sapphire blue tints when the dyestuff is in a suitable stage of dispersion.

A similar dyestuff is obtained by using 1-amino-2-cyano-4-nitro-6-bromaniline as the diazotizing component.

Dyestuffs soluble in organic solvents are also obtained by coupling the diazo-compound from 1-amino-2-cyano-4:6-dinitrobenzene or from 1-amino-2-cyano-4-nitro-6-bromo- or -6-iodobenzene with the base indicated in this example. This base can also be replaced by other bases, for example 1-N-dimethyl-2:5-diacetylaminobenzene, 1-N-dimethyl-2-formylamino-5-ethoxyaminobenzene, 1-N-diethyl-2:5-diformylaminobenzene, 1-N-dihydroxyethyl-2-methoxy-5-formylaminobenzene, 1-N-dimethyl-2-methysulfamino-5-acetylaminobenzene or 1-N-dimethyl-2:5-diethylsulfaminobenzene.

*Example 4*

19.75 parts of 1-amino-2-cyano-4-nitro-6-chloraniline are diazotized as described above and the diazo solution is coupled with a solution of 29.6 parts of 1-N-(dimethoxyethyl)-amino-2-methoxy-5-acetylaminobenzene in dilute hydrochloric acid. The coupling is completed by addition of sodium acetate. The dyestuff obtained of the formula:

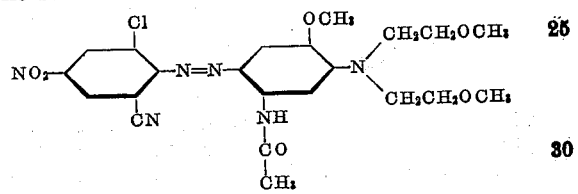

is, when dry, a dark powder soluble in organic solvents such as acetone and ethyl acetate to a greenish blue solution and dyeing acetyl cellulose in the mass pure sapphire blue tints.

When coupling the diazo-compound of this example with 1-N-ethyl-β-chloroethyl-2-methoxy-5-acetylaminobenzene, 1-N-ethyl-β-cyanoethyl-2-methoxyaminobenzene or 1-N-hydroxyethyl-β-cyanoethyl-2-ethoxyaminobenzene, there are obtained dyestuffs having similar properties.

*Example 5*

10 parts of the dyestuff described in Example 3 are stirred to produce a uniform paste containing 20 per cent of dyestuff with a suitable dispersing agent such as Turkey red oil, sulfite cellulose liquor or sulfonation products of the residue from the manufacture of benzaldehyde. 1 part of this paste is intimately mixed with 10 parts of water at 50° C. and so much of a concentrated soap solution as will produce in a dye bath prepared with the paste a solution of soap of 2 per cent strength. The mixture is then diluted with about 300 parts of cold water. Into the emulsion thus prepared are entered 10 parts of artificial acetate silk yarn; the goods are handled, the bath being heated within ¾ hour to 80–85° C. and dyeing continued for about another ¼ hour at this temperature. The goods are then rinsed and brightened as usual. There are obtained vivid bright blue dyeings.

What we claim is:

1. Mono-azo-dyestuffs of the general formula:

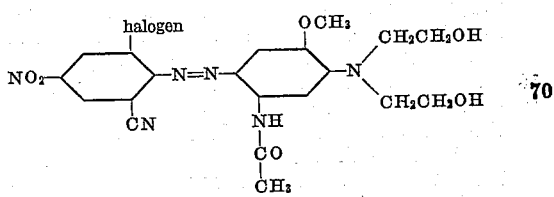

which dyestuffs are dark powders which dye acetate artificial silk green-blue tints of good fastness and dischargeability.

2. The mono-azo-dyestuff of the formula:

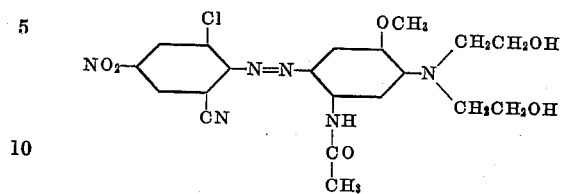

which is a dark powder which dyes acetate artificial silk green-blue tints of good fastness and dischargeability.

3. The mono-azo-dyestuff of the formula:

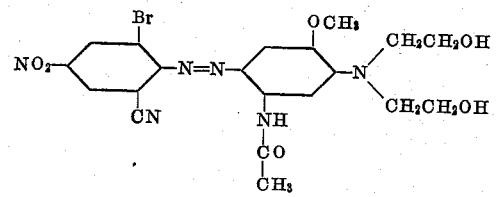

which is a dark powder which dyes acetate artificial silk green-blue tints of good fastness and dischargeability.

FRIEDRICH FELIX.
WILHELM HUBER.